United States Patent [19]

Sandiumenge

[11] 4,307,584
[45] Dec. 29, 1981

[54] RESILIENT COUPLING MECHANISM

[75] Inventor: José M. B. Sandiumenge, Barcelona, Spain

[73] Assignee: Damper Iberica, S.A., Spain

[21] Appl. No.: 50,538

[22] Filed: Jun. 21, 1979

[30] Foreign Application Priority Data

May 9, 1979 [ES] Spain .................................. 480.783

[51] Int. Cl.³ .............................................. F16D 3/64
[52] U.S. Cl. .................. 64/14; 64/27 NM; 64/1 C
[58] Field of Search ............ 64/14, 9 R, 9 A, 27 NM, 64/11 R, 27 R, 1 C

[56] References Cited

U.S. PATENT DOCUMENTS

| | | | |
|---|---|---|---|
| 2,621,493 | 12/1952 | Croset | 64/14 |
| 2,716,334 | 8/1955 | Scott et al. | 64/27 NM |
| 3,197,216 | 7/1965 | Jackson | 64/27 NM |
| 3,529,440 | 9/1970 | Bauer | 64/14 |
| 3,575,014 | 4/1971 | Wright | 64/14 |
| 3,662,568 | 5/1972 | Kashima et al. | 64/14 |

FOREIGN PATENT DOCUMENTS 763768 12/1956 United Kingdom .................... 64/14

Primary Examiner—Charles J. Myhre
Assistant Examiner—Magdalen Moy
Attorney, Agent, or Firm—Scully, Scott, Murphy & Presser

[57] ABSTRACT

A mechanism for the resilient coupling of a driving shaft to a driven shaft wherein an outer member is coaxial with an inner member, both members having radially extending longitudinal blades with those of one member intercalated with those of the other, with resilient pads between each pair of adjacent blades, and wherein the blades of at least one of the members are associated for their drive with the means connecting the same member to the corresponding shaft, by the interaction of the said blades with companion elements on the plate with which said connecting means are provided.

2 Claims, 8 Drawing Figures

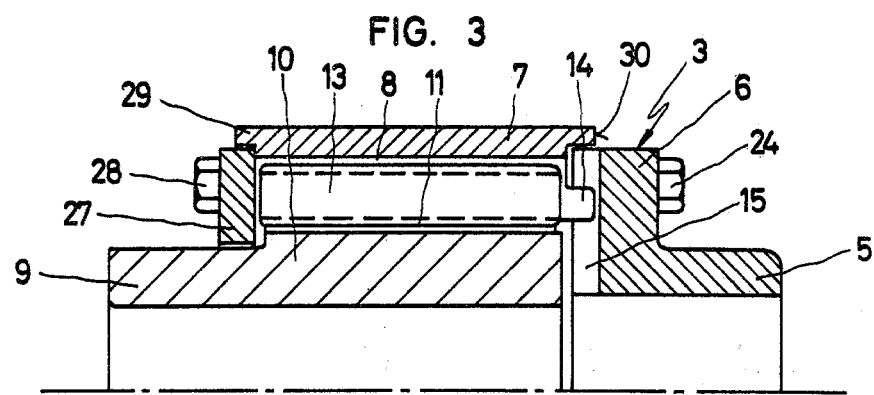
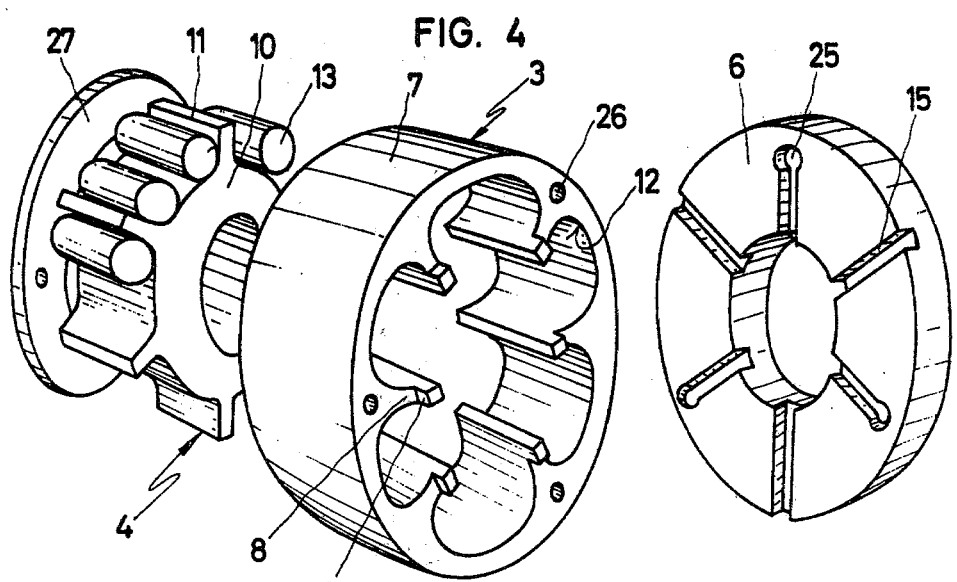
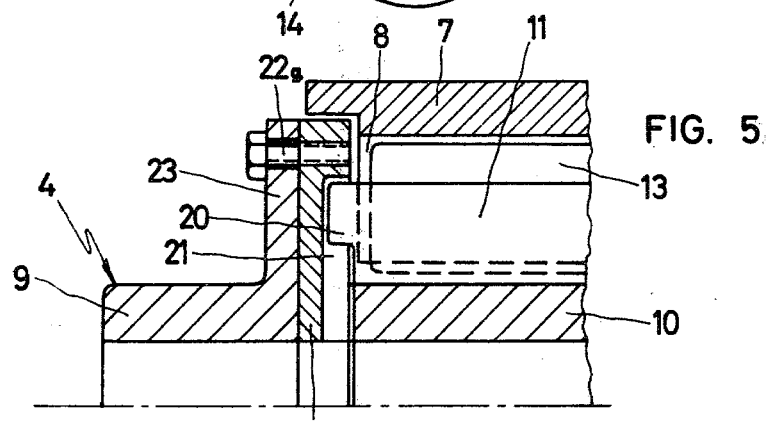

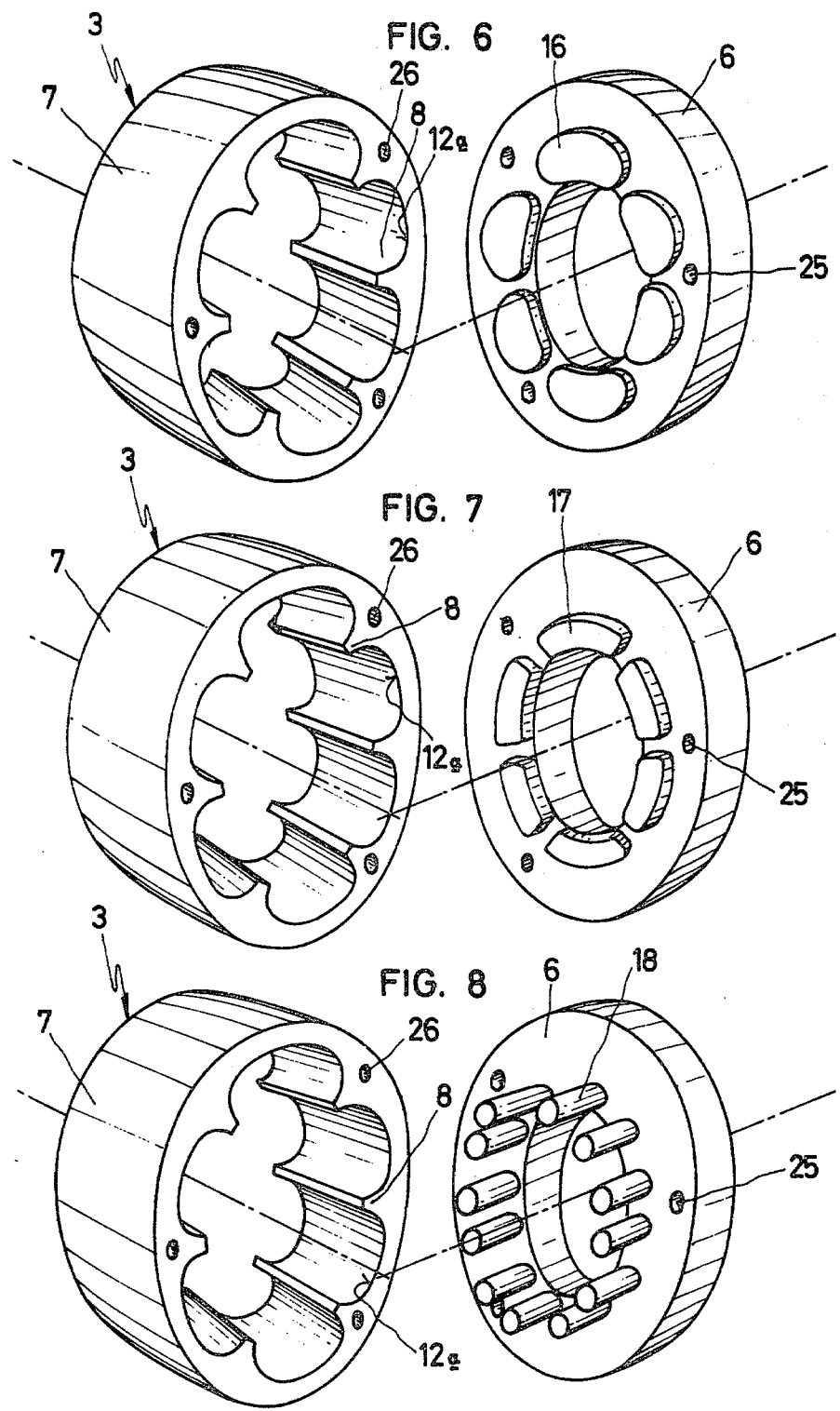

RESILIENT COUPLING MECHANISM

FIELD OF THE INVENTION

The present invention relates to a mechanism for the resilient coupling of a driving shaft to a driven shaft, of the type comprising an outer member and an inner member, the outer member comprising a ring having radially extending longitudinal blades on the inner surface thereof and means for connection to one of the shafts, said means comprising a plate applied to a front face of said ring, the inner member comprising a core which is generally coaxial with said ring and surrounded thereby and provided with radially extending longitudinal blades on the outer surface thereof and means for connection to the other shaft which means may be provided with a plate applicable to the core, the blades of each of the members being intercalated with those of the other member, thereby forming therebetween longitudinal spaces in each of which there is housed a resilient pad which is compressed between one blade of the outer member and another blade of the inner member.

DESCRIPTION OF THE PRIOR ART

Two types of mechanisms for the coupling of a driving shaft to a driven shaft are generally used in industrial applications. Both types provide for a slight degree of misalignment of the shafts, without any appreciable reduction of the transmitted power.

One of the above types is constituted by the association of two gears, each attached to its corresponding shaft and a rigid sleeve mounted concentrically around the said gears and meshing therewith on its inner surface, thereby transmitting the movement from one of the gears to the other at the same time as the curved profile of the teeth of the said gears allows for a slight degree of misalignment between the shafts. If this mechanism is made of metal throughout, it requires to be operated in an oil bath.

The other type is the one defined at the beginning of this specification and, as observed, is resilient in comparison with the one described in the foregoing paragraph, which is rigid.

The advantages of this type of resilient coupling are well known, particularly because of the ease of maintainance, since no oil bath is required, because they allow for appreciable degrees of misalignment and axial deflection and because they absorb vibrations and load shocks. Nevertheless, in comparison with the metal gear couplings, they have the disadvantage of larger size-cost, with the concomitant disadvantages of occupying a large space.

Also, this type of resilient coupling requires the use of collars or flanges for connection of the metal parts of which there are at least two forming the outer member. These collars cause a greater moment of inertia, which is a further disadvantage.

The said collars are attached with bolts which, consequently, work under shearing stress.

SUMMARY OF THE INVENTION

The object of the present invention is to provide a mechanism which overcomes the above disadvantages. The mechanism is characterised fundamentally in that the blade bearing element of at least one of the members of the mechanism and the means for connection of said member to the shaft are associated together for their drive, by the interaction of the blades with companion elements provided on the plate attached to the connecting means.

BRIEF DESCRIPTION OF THE DRAWINGS

The invention is described hereinafter with reference to the accompanying illustrative drawings, in which:

FIG. 3 is a view of half of the section along the line III—III of FIG. 1;

FIG. 4 is an exploded view of the mechanism, from which the means of connection to the shafts have been omitted;

FIG. 5 is a part diametral section view of the interior of the mechanism;

FIGS. 6, 7 and 8 are perspective views of different embodiments of the ring and plate of the outer member, without the means of connection to the shaft;

DESCRIPTION OF THE INVENTION

Figure 1:
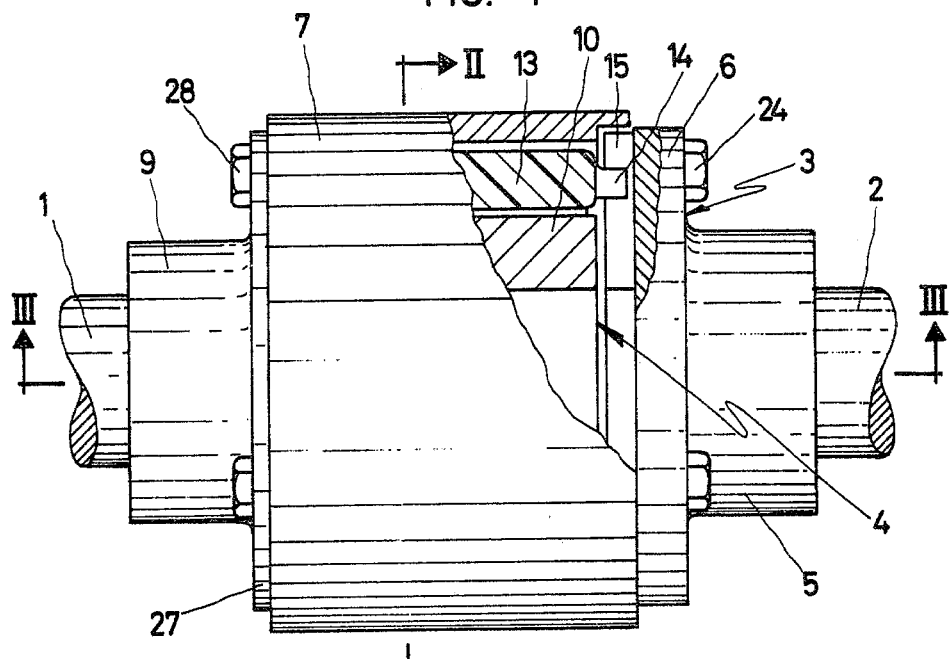
FIG. 1 is a side elevation view, partly in section, of the mechanism of the invention.

In the Figures there is seen the shaft 1 and the shaft 2, one of which is the driving shaft and the other the driven shaft. These shafts are coupled together with the coupling mechanism consisting of an outer member 3 attached to the shaft 2 and an inner member 4 attached to the shaft 1.

Said outer member 3 comprises a head 5 providing for the connection of the mechanism to the shaft 2 by conventional means not shown. This head 5 is attached to a plate 6, which is applied to a front face of the ring 7. The ring is provided with radially extending longitudinal blades 8 on the inner surface thereof.

The internal member 4 also comprises a head 9 providing in turn for connection of the mechanism to the shaft 1, again by conventional means not shown. The head 9 is attached to a core 10 which is coaxial with the ring 7 and surrounded thereby and said core 10 is provided externally with radially extending longitudinal blades 11. The blades 8 and blades 11 are mutually intercalated and define therebetween longitudinal spaces 12, in each of which there is housed a resilient pad 13 working under compression to transmit the rotary movement from one member to the other.

The elements described up to now are well known in the art. Nevertheless, up to the present the transmission between the plate 6 and ring 7 has been effected by providing a peripheral collar on the ring which is applied to a peripheral collar of the plate and the two collars are attached to one another by bolts. These bolts have to withstand the shear stresses of the transmission, a source of considerable mechanical disadvantages.

According to the invention, the transmission between the plate 6 and the ring 7 is effected by the interaction of the blades 8 with companion members on the plate. According to the example of a preferred embodiment shown in FIGS. 1 to 4, said interaction takes place by means of the longitudinal extension 14 of each blade 8, acting as male member, each of said extensions 14 being adapted for insertion in one of the radial slots 15 in the plate 6, comprising the corresponding female members.

According to other forms of embodiment (FIGS. 6, 7 and 8), the male elements are mounted on the plate 6 extending axially therefrom and are adapted for insertion in the space 12a defined between two consecutive blades 8, and engaging simultaneously to the opposed sides of said spaces 12a. According to the embodiment of FIG. 6, said male elements are the segments 16 which extend axially outwards from the plate and which occupy the whole of the cross section of the spaces 12a. In the embodiment illustrated in FIG. 7, the segments 17 extending axially outwards from the plate 6 do not occupy the whole of the cross section of the spaces, although they do extend between the opposed sides thereof. In this case, each of the segments 17 may be accompanied by a filler piece, together with which the whole of the cross section of the corresponding space 12a is covered, to avoid the possibility of the resilient pads 13 being nipped. In the embodiment illustrated in FIG. 8, the plate 6 is provided with a plurality of pairs of spigots 18, adapted to be inserted in the spaces 12a, each member of each pair of spigots bearing against an opposite side of each space. Said spigots may be provided with an anti-friction coating of Teflon or other appropriate material.

A transmission like the one described may also be provided for the inner member 4, in place of or as well as the outer member 3 transmission.

In this case (FIG. 5), each of the blades 11 of the core 10 is provided with a longitudinal extension 20 as male element inserted in the slots 21, as female element, in the plate 22, attached by bolts 22a to a flange 23 which extends radially from the periphery of head 9.

Additionally, as shown in FIGS. 1, 3 and 4 and 6 to 8 the plate 6 is axially attached to ring 7 by bolts 24 located through bores 25 and 26 of said elements.

Figure 2:
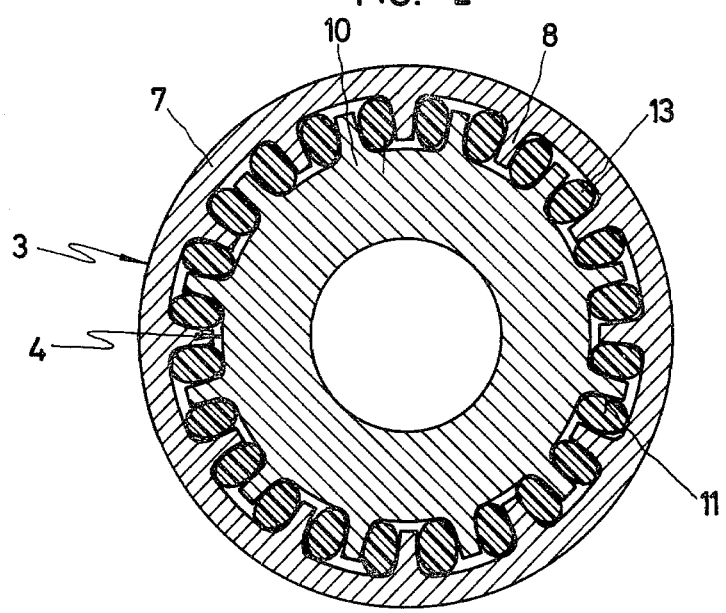
FIG. 2 is a sectional view along the line II—II of FIG. 1.

To avoid any axial displacement of the resilient pads 13, there is provided an annular cover plate 27 held in place by bolts passing through holes in the opposite side to the plate 6 of the external member 3, as seen in FIGS. 2 and 3.

Moreover, it is contemplated that the ring 7 (FIG. 3) should have peripheral lips 29 and 30 at both ends thereof, the first of which is for centering the annular cover plate 27, whereas the latter is simply a cover plate for covering the slots 15 of the plate 6.

The resilient pads 13 may be made of rubber or synthetic resin or of any other appropriate material to allow the necessary compression to transmit the load between the blades 8 and 11.

In the present examples, the outer member 3 and inner member 4 have been shown as having heads 5 and 9, respectively, which are keyed or otherwise attached to the shafts 1 and 2, or vice versa, although it is contemplated that at least one of the members of the mechanism should be provided with an assembly arrangement appropriate for the intended purpose, such as a sleeve with two flanges, a pulley, a flywheel, a brake drum, etc.

The extensions 14 and 20 for the blades 8 and 11, respectively, are mating elements on being inserted in the slots 15 and 21 of the plates 6 and 22, it being feasible to increase the rigidity of the mating engagement by providing such extensions or slots with a certain degree of taper with a view to improving the mating of one element with the other.

As a further result of the above, there is produced between the ring 7 and the plate 6 and the core 10 and the plate 22 a self-centering effect facilitating the assembly and balancing of the mechanism.

The transmission or drive described between the plate and ring is applicable for the assembly of coupling mechanisms in series, it being sufficient for the extension 14 of the blades 8 of two adjacent rings 7 to couple up with notches in an intermediate plate having thickness thereof.

The present resilient coupling mechanism has a wide range of applications particularly for driving pump units, electric generating units, welding generators, compressor units, marine engines, mining machinery, rolling mills, compressors in general and other machines or apparatus regularly or accidently subject to substantial torque or to vibration.

What I claim is:

1. A mechanism for the resilient coupling of a driving shaft to a driven shaft, of the type comprising an outer member and an inner member, the outer member comprising a ring having radially extending longitudinal blades on the inner surface thereof and means for connection to one of the shafts, said means comprising a plate applied to a front face of said ring, the inner member comprising a core which is generally coaxial with said ring and surrounded thereby and provided with radially extending longitudinal blades on the outer surface thereof and means for connection to the other shaft, which means may be provided with a plate applicable to the core, the blades of each of the members being intercalated with those of the other member, thereby forming therebetween longitudinal spaces in each of which there is housed a resilient pad which is compressed between one blade of the outer member and another blade of the inner member, wherein the blade bearing element of at least one of the members of the mechanism and the means for connection thereof to the corresponding shaft are associated together for their drive by the interaction of male elements on the blades, each comprised of a longitudinal extension of the blade, with female elements on the plate, each comprised of a radial slot in the plate.

2. A mechanism for the resilient coupling of a driving shaft to a driven shaft, of the type comprising an outer member and an inner member, the outer member comprising a ring having radially extending longitudinal blades on the inner surface thereof and means for connection to one of the shafts, said means comprising a plate applied to a front face of said ring, the inner member comprising a core which is generally coaxial with said ring and surrounded thereby and provided with radially extending longitudinal blades on the outer surface thereof and means for connection to the other shaft, which means may be provided with a plate applicable to the core, the blades of each of the members being intercalated with those of the outer member, thereby forming therebetween longitudinal spaces in each of which there is housed a resilient pad which is compressed between one blade of the outer member and another blade of the inner member, wherein the blade bearing element of at least one of the members of the mechanism and the means for connection thereof to the corresponding shaft are associated together for their drive by the interaction of the blades with companion elements provided on the plate attached to the connecting means, wherein the interaction between the blades and the plate of one same member is effected by male elements on the plate and female elements defined by the spaces between two successive blades of the same member and further, wherein the male elements on the plate comprise pairs of spigots extending axially outwards from the plate and are adapted for insertion in the spaces between two adjacent blades, each member of each pair of spigots bearing against an opposite side of each space.

* * * * *